(12) United States Patent
Hasberg et al.

(10) Patent No.: US 10,962,375 B2
(45) Date of Patent: Mar. 30, 2021

(54) METHOD AND DEVICE FOR EVALUATING THE CONTENTS OF A MAP

(71) Applicant: Robert Bosch GmbH, Stuttgart (DE)

(72) Inventors: Carsten Hasberg, Ilsfeld-Auenstein (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 266 days.

(21) Appl. No.: 15/766,950

(22) PCT Filed: Sep. 28, 2016

(86) PCT No.: PCT/EP2016/073143
§ 371 (c)(1),
(2) Date: Apr. 9, 2018

(87) PCT Pub. No.: WO2017/067767
PCT Pub. Date: Apr. 27, 2017

(65) Prior Publication Data
US 2019/0063928 A1 Feb. 28, 2019

(30) Foreign Application Priority Data

Oct. 22, 2015 (DE) .......................... 102015220695.5

(51) Int. Cl.
*G01C 21/30* (2006.01)
*G01C 21/32* (2006.01)
(Continued)

(52) U.S. Cl.
CPC .............. *G01C 21/30* (2013.01); *G01C 21/32* (2013.01); *G01S 7/412* (2013.01); *G01S 13/874* (2013.01);
(Continued)

(58) Field of Classification Search
CPC ......... G01C 21/30; G01C 21/32; G01S 7/412; G01S 2013/93272; G01S 2013/93271;
(Continued)

(56) References Cited

U.S. PATENT DOCUMENTS

2011/0047338 A1* 2/2011 Stahlin ................... G01C 21/28
711/154
2011/0054716 A1* 3/2011 Stahlin ................... G01C 21/28
701/1

(Continued)

FOREIGN PATENT DOCUMENTS

DE 102008046683 A1 3/2009
DE 102008053531 A1 5/2009
(Continued)

OTHER PUBLICATIONS

International Search Report dated Mar. 1, 2017, of the corresponding International Application PCT/EP2016/073143 filed Sep. 28, 2016.

*Primary Examiner* — Jonathan M Dager
*Assistant Examiner* — Jean W Charleston
(74) *Attorney, Agent, or Firm* — Norton Rose Fulbright US LLP; Gerard Messina

(57) ABSTRACT

A method and a device for evaluating the contents of a map, the map containing at least one first driving environment feature, including a step of recording at least one second driving environment feature by at least one sensor of at least one vehicle, a step of comparing the at least one first driving environment feature contained in the map to the at least one second, recorded driving environment feature, and a step of evaluating the contents of the map as a function of the performed comparison.

15 Claims, 3 Drawing Sheets

(51) Int. Cl.
*G01S 7/41* (2006.01)
*G01S 13/87* (2006.01)
*G01S 13/89* (2006.01)
*G01S 13/931* (2020.01)

(52) U.S. Cl.
CPC ....... *G01S 13/89* (2013.01); *G01S 2013/9323* (2020.01); *G01S 2013/9324* (2020.01); *G01S 2013/93271* (2020.01); *G01S 2013/93272* (2020.01)

(58) Field of Classification Search
CPC ..... G01S 2013/9324; G01S 2013/9323; G01S 13/89; G01S 13/874
USPC ......................................................... 701/448
See application file for complete search history.

(56) References Cited

U.S. PATENT DOCUMENTS

| | | | |
|---|---|---|---|
| 2011/0125401 A1* | 5/2011 | Stahlin | G01C 21/26 701/532 |
| 2011/0161032 A1* | 6/2011 | Stahlin | G01C 21/30 702/94 |
| 2011/0191019 A1* | 8/2011 | Holsinger | G01C 21/00 701/533 |
| 2011/0196571 A1* | 8/2011 | Foladare | G08G 1/207 701/31.4 |
| 2012/0310516 A1* | 12/2012 | Zeng | G01S 17/42 701/300 |
| 2013/0151146 A1* | 6/2013 | Syed | G01C 21/30 701/446 |
| 2013/0268189 A1* | 10/2013 | Kritt | G01C 21/00 701/410 |
| 2014/0025292 A1* | 1/2014 | Stahlin | G08G 1/0129 701/461 |
| 2015/0081211 A1* | 3/2015 | Zeng | B60W 30/0956 701/446 |
| 2017/0203682 A1* | 7/2017 | Atsmon | B60Q 1/085 |
| 2018/0012085 A1* | 1/2018 | Blayvas | G06T 7/70 |

FOREIGN PATENT DOCUMENTS

| | | |
|---|---|---|
| DE | 102008012697 A1 | 6/2009 |
| DE | 102014013672 A1 | 4/2015 |
| WO | 2009056533 A1 | 5/2009 |
| WO | 2009101163 A2 | 8/2009 |

\* cited by examiner

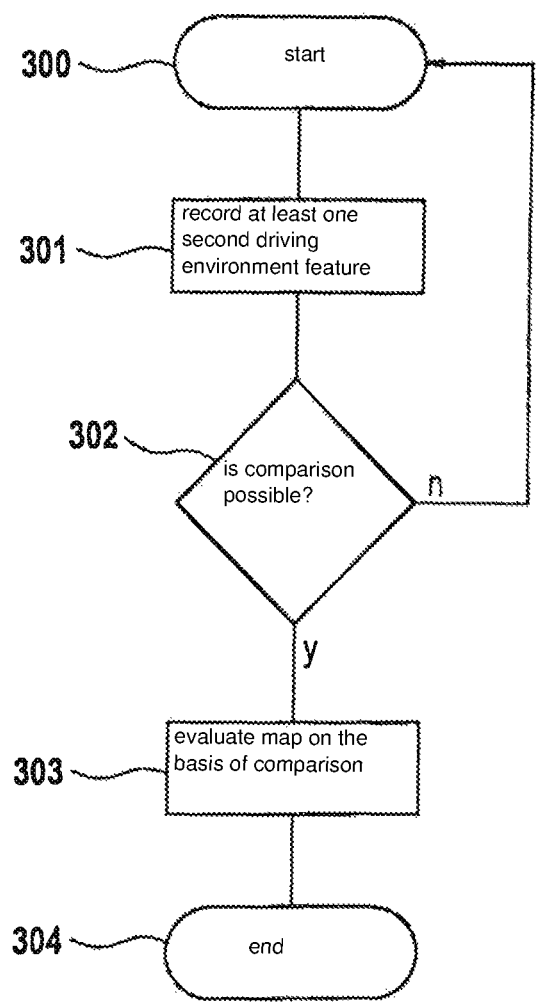

METHOD AND DEVICE FOR EVALUATING THE CONTENTS OF A MAP

FIELD

The present invention relates to a method, as well to a device for motor vehicles for evaluating the contents of a map; driving environment features being consulted to evaluate the contents.

BACKGROUND INFORMATION

German Patent Application No. DE 10 2014 013 672 A1 describes methods for ensuring the safety and reliability of an autonomous or partially autonomous operation of vehicles on a traffic roadway system, where one or a plurality of vehicles travel on the traffic roadway system, the vehicles each have sensors for recording an environment, a digital road map of the traffic roadway system, and a communication unit for communicating with an external server and an evaluation unit. It is a distinction of the method that the evaluation unit determines information on the suitability of this route for an autonomous or partially autonomous operation of vehicles on the basis of the recorded driving environment and the digital road map for a route covered by the particular vehicle.

SUMMARY

An example method according to the present invention and, accordingly, an example device according to the present invention for evaluating the contents of a map, the map containing at least one first driving environment feature, are based on a step whereby at least one sensor of at least one vehicle records at least one second driving environment feature, on a step of comparing the at least one first driving environment feature contained in the map with the at least one second, recorded driving environment feature, and a step of evaluating the contents of the map as a function of the performed comparison.

The vehicle may be a manned, as well as an unmanned aircraft, and/or watercraft and/or land vehicle that includes a device according to the present invention. The vehicle may also be partially or highly automated.

An advantage of the method according to the present invention resides in that the validity, thus the completeness and/or the accuracy of a map in terms of the contents thereof, is verified and enhanced by constantly evaluating the same. This is a basic prerequisite for partially or highly automated vehicles, in particular, whose safe and reliable navigation substantially depends on (highly) accurate and complete map material.

An especially preferred specific embodiment provides that the at least one sensor of the at least one vehicle record the at least one second driving environment feature by directly detecting the at least one second driving environment feature and/or by indirectly detecting the same. This is especially achieved by the assignment of at least one recorded driving environment property and/or at least one recorded driving environment object.

This makes it possible for driving environment features to be recorded more reliably and comprehensively since individual driving environment objects and/or individual driving environment properties suffice for recording important driving environment features that are required for the example method and for consulting the same to compare the driving environment features in the map and, as the case may be, for using the same to evaluate the contents of the map.

On the basis of the comparison, it is preferably checked whether the at least one recorded, second driving environment feature is verified by the at least one first driving environment feature in the map.

By verifying the driving environment features present in the map on the basis of the driving environment features recorded by the vehicle, an accurate matching of the features contained in the map with those actually present is obtained. The result is that the map is always very current.

The evaluation is preferably performed in accordance with specified evaluation criteria.

By specifying the evaluation criteria for implementing the example method, it is possible to determine how the map is to be actually evaluated in any desired accuracy and with any desired complexity. Thus, the method according to the present invention may be adapted to any situation and/or requirements.

In an especially preferred specific embodiment, the contents of the map are evaluated locally within the detection range of the at least one sensor of the at least one vehicle.

The result is a very current map, which is a significant advantage in terms of safety for partially or highly automated vehicles, in particular, especially for the vehicle's safe driving environment and thus also for other vehicles that use the same route and rely on the same navigable area.

The evaluation criteria are preferably specified in such a way that a predefined first minimum number of first driving environment features, which are contained in the map, are compared to and/or verified by a second predefined minimum number of second driving environment features, which are recorded by the at least one sensor of the at least one vehicle.

Specifying a minimum number, both of the first driving environment features contained in the map, as well of the second, recorded driving environment features makes possible a differentiated and quantified evaluation of the map. Moreover, individual deviations, whose relevance is questionable, may be filtered out. This makes possible a reduction in and continued clear structuring of the volume of data that includes the recorded driving environment features, thereby facilitating the data flow, both between the steps of the method according to the present invention and, as needed, to an external processing unit.

In an especially preferred specific embodiment, the evaluation criteria are specified in such a way that the contents of the map are locally assessed as valid within the detection range of the at least one sensor of the at least one vehicle, in that a predefined first minimum number of first driving environment features, which are contained in the map, is verified by a second predefined minimum number of second driving environment features, which are recorded by the at least one sensor of the at least one vehicle. Alternatively, the contents of the map are assessed as locally invalid in that a predefined first minimum number of first driving environment features is not verified by a second predefined minimum number of second driving environment features.

The evaluation of the map contents is further differentiated by separating the assessment into valid and, as the case may be, invalid areas. Moreover, this makes it possible to quickly and safely subdivide the map into areas that are reliably known and those that are not reliably known, knowledge of these areas being of utmost importance to partially or highly automated vehicles, in particular.

The at least one first driving environment feature and/or the at least one second driving environment feature are/is preferably a structure, especially a tunnel and/or a bridge and/or a service area and/or a building and/or a toll plaza and/or a service station and/or a geographical feature, especially a lake and/or a river and/or a stream and/or mountains and/or a forest and/or a traffic sign, especially a street sign and/or a traffic light and/or a component of the traffic infrastructure, especially a guardrail and/or a parking space and/or a lane marking.

In accordance with the present invention, a device is provided for evaluating the contents of a map, the map containing at least one first driving environment feature. The device thereby includes a first element for recording at least one second driving environment feature by at least one sensor of the at least one vehicle, a second element for comparing the at least one first driving environment feature contained in the map to at least one second, recorded driving environment feature, and a third element for evaluating the contents of the map as a function of the performed comparison.

The second element is preferably adapted in a way that makes it possible to use the comparison to check whether the at least one recorded, second driving environment feature is verified by the at least one first driving environment feature in the map.

In an especially preferred specific embodiment, the third element is adapted in such a way that the contents of the map are evaluated in that a predefined first minimum number of first driving environment features, which are contained in the map, is compared to and/or verified by a second predefined minimum number of second driving environment features, which are recorded by the at least one sensor of the at least one vehicle.

Furthermore, the device includes a communication device for transmitting and receiving first data that represent at least one second driving environment feature recorded by the at least one sensor of the at least one vehicle. It is also possible for second data, which represent at least one comparison of the at least one first driving environment feature contained in the map to the at least one second, recorded driving environment feature and/or third data, which represent at least one evaluation of the contents of the map as a function of the performed comparison, to be transmitted and received.

Another embodiment provides a method for operating at least one vehicle, the operation being performed as a function of the evaluation of the contents of a map; and the evaluation of the contents of the map, the map containing at least one first driving environment feature, encompassing a step of recording at least one second driving environment feature by at least one sensor of at least one vehicle, as well as a step of comparing the at least one first driving environment feature contained in the map to the at least one second, recorded driving environment feature, and a step of evaluating the contents of the map as a function of the performed comparison.

Advantageous embodiments of the present invention are described herein.

BRIEF DESCRIPTION OF THE DRAWINGS

Exemplary embodiments of the present invention are illustrated in the figures and are explained in greater detail below.

FIG. 3 shows a flow chart of an exemplary embodiment of the method according to the present invention.

DETAILED DESCRIPTION OF EXAMPLE EMBODIMENTS

Figure 1:
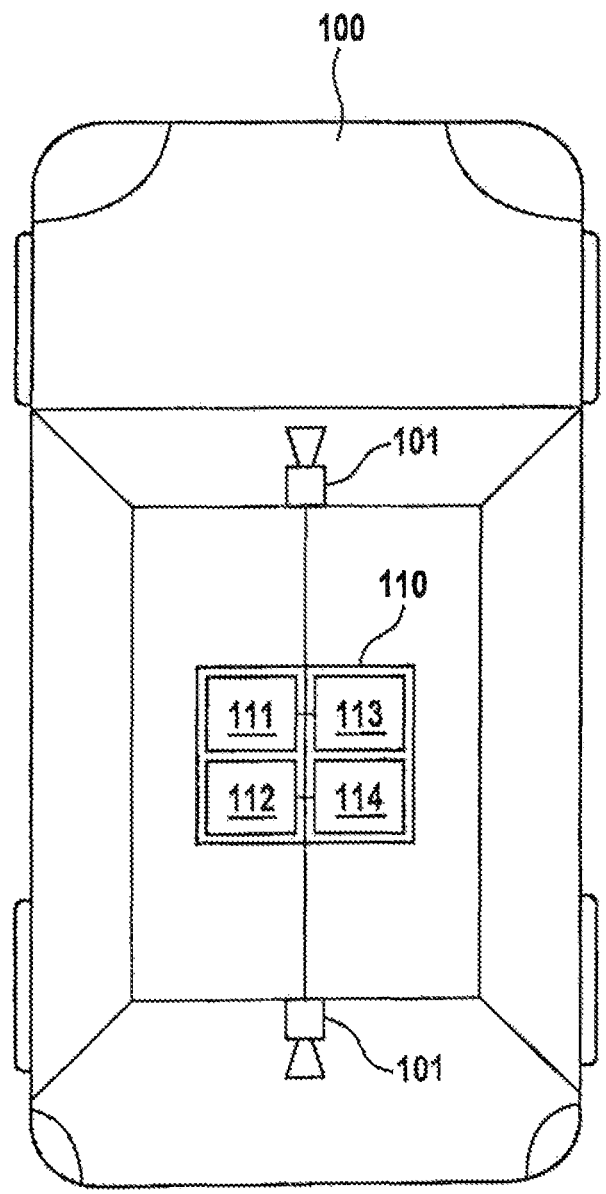
FIG. 1 shows purely exemplarily a vehicle that includes the device according to the present invention for implementing the method according to the present invention.

FIG. 1 depicts a vehicle (100) that is shown here exemplarily as a four-wheeled motor vehicle. It includes, on the one hand, device (110) according to the present invention and, on the other hand, at least one sensor (101) for recording at least one second driving environment feature. The at least one sensor (101) is a radar sensor, lidar sensor, video sensor or ultrasonic sensor, for example, or any other sensor that is designed for recording driving environment features. It is also possible to use a plurality of sensors of the same or different type of design to record the at least one second driving environment feature.

The example device in accordance with the present invention includes, inter alia, first element (111) designed for recording driving environment features by the at least one sensor (101) of vehicle (100). This is understood to mean that driving environment values, which represent the at least one second driving environment feature, are recorded by the sensors, the recorded values are transmitted to first element (111) and are analyzed and evaluated with the aid thereof. They encompass all the necessary prerequisites, such as appropriate computer hardware and calculation software.

The at least one second driving environment feature may be recorded both directly, i.e., a building is recognized as a building, as well as indirectly, such as, for example, by assigning driving environment properties and/or driving environment objects to driving environment features. An indirect recording signifies, for example, that a tunnel is recorded as a driving environment feature, in that at least one sensor (101) of vehicle (100) records a brief darkening as a driving environment property and, within the same time span, close walls to the left and/or right of the roadway as a driving environment object. Another possible way for a tunnel to be detected is, for example, for a corresponding sign to be recorded that indicates the name and/or the length of the tunnel. A way to indirectly record a bridge, for example, is to detect the name of a river on a sign and, by video sensor, a railing to the left and/or right of the roadway. In correspondence therewith, first element (111) belonging to device (110) likewise check the plausibility of the driving environment values that are recorded by the at least one sensor (101) and represent the at least one second driving environment feature.

Device (110) according to the present invention also includes second element (112) which makes it possible for a comparison to be made between the at least one second driving environment feature recorded by sensor (101) and the at least one first driving environment feature that is contained in a map (200). In this context, map (200) contains at least one driving environment feature (201) that is stored as such, i.e., the coordinates of the driving environment feature as well as of the classification thereof. This may be both a rough classification, for example, a bridge and a tunnel are classified as structures, or even a more precise classification, where they are actually classified as a bridge and tunnel. Another way to perform this comparison is to compare properties of the at least one recorded, second driving environment feature to the at least one first driving environment feature contained in map (200), for example, the shape and/or the size and/or the color and/or the surface thereof.

Furthermore, second element (112) is adapted for verifying the at least one recorded, second driving environment feature on the basis of the at least one first driving environment feature contained in map (200).

This may signify, for example, that, in case that the at least one second driving environment feature is recorded, and an assignment by first element (111) is not unique, thus, there is no unique assignment in spite of certain recorded properties, this at least one second driving environment feature is verified in that an assignment and thus a comparison of properties likewise known or contained in map (200) are possible on the basis of the recorded properties of the second driving environment feature and on the basis of at least one driving environment feature already contained in map (200). Thus, if a second driving environment feature is not uniquely recognized since, for example, a required number of properties that uniquely describe this second driving environment feature is not recorded, this number of properties may nevertheless suffice to complete a driving environment feature contained in map (200) using known properties and thus to verify the second driving environment feature.

In addition, the device includes third element (113) which enables the contents of map (200) to be evaluated on the basis of the comparison performed by second element (112). Due to the computer hardware and calculation software thereof, the third element is suitably designed for performing the evaluation in accordance with specified criteria. The contents of map (200) may thereby be evaluated both for accuracy and for completeness. Accuracy here is understood to be the exact localization, thus the exactness of the coordinates of the at least one driving environment feature contained in map (200), and completeness is understood to be the number of actually existing second driving environment features that are recordable, for example, by the at least one sensor (101) of vehicle (100) and that are actually also contained as first driving environment features in map (200).

In addition, device (110) includes a communication element (114) for transmitting and receiving data. This is necessary, for example, when individual steps of the inventive method are executed in an external processing unit and the results are transmitted again to vehicle (100).

Furthermore, entire device (110) according to the present invention may be contained in an external processing unit, and the at least one sensor (101) of the at least one vehicle (100) only be used to record second driving environment features in the form of raw data. This is practical when a higher computing capacity in an external processing unit permits faster and/or better results, thus, for example, a more reliable evaluation of the contents of map (200). Once the contents of map (200) are evaluated in the external processing unit, the results may then be again transmitted back to vehicle (100).

This allows the contents of map (200) to be evaluated in real time and thus, for example, is an aid to driver assistance systems that are based on exact map data (for partially or highly automated vehicles).

The contents of map (200) may be evaluated, for example, by comparing the number of recorded, second driving environment features locally and/or globally to the number of first driving environment features contained in map (200). In this context, the map is locally and/or globally assessed as valid as a function of the number of matches of the driving environment features to be compared if, for example, in relation to the number of actually recorded second and/or first driving environment features, the first and second driving environment features contained in map (200) are recognized as sufficiently matching to an extent specified by the evaluation criteria.

Conversely, map (200) is locally and/or globally assessed as invalid if the number of matches between the first and second driving environment features falls short of a specified value.

The contents of map (200) may also be evaluated in such a way that it is not the number of matches between the first and second driving environment features that is decisive, rather the number of matches between the properties of the individual first and second driving environment features, both contained in map (200) as well as recorded by the at least one sensor (101) of the at least one vehicle (100). The map may be thereby assessed as valid, for example, precisely when it preferably becomes rarely necessary for a first driving environment feature to be used to verify a second driving environment feature.

Figure 2:
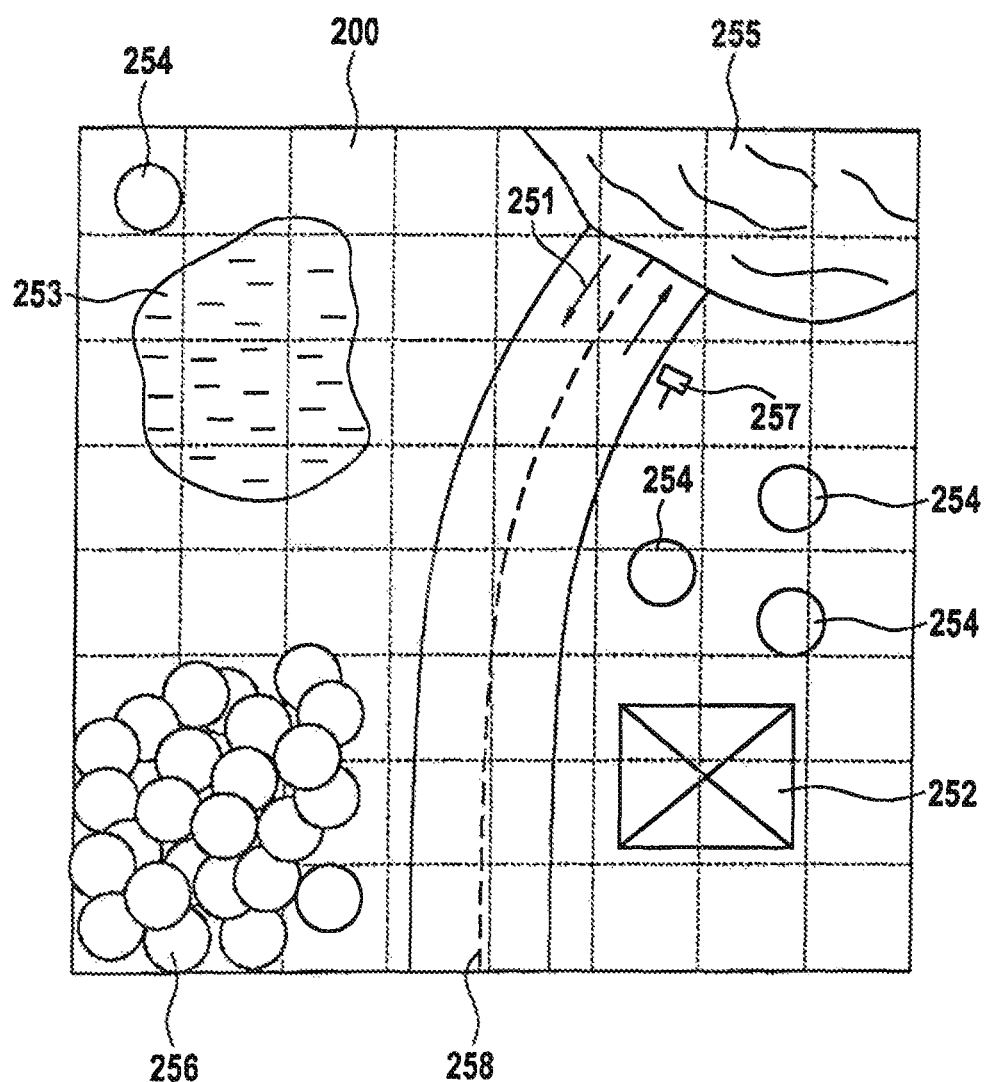
FIG. 2 shows purely exemplarily a map that contains various driving environment features.

FIG. 2 shows exemplarily a map (200) whose contents are evaluated using the method according to the present invention. The map shown here contains a plurality of driving environment features, such as a tunnel (251), a building (252), a lake (253), a plurality of trees (254), mountains (255), a forest (256), a street sign (257) and a roadway having lane pavement markings (258).

Each of these first driving environment features is indicated both by the classification thereof, as well as by the position thereof within map (200), as specified by the partitioning of map (200) by the dotted line grid. If, at this stage, at least one second driving environment feature is recorded by the at least one sensor (101) of the at least one vehicle (100), it is compared to a first driving environment feature already contained in map (200). The design of the elements (111, 112) according to the present invention is such that the recording of several trees is also recognized as a forest (256) contained in map (200). This is accomplished by specified recording criteria, which, for example, do not assess individual trees (254) to be a forest due to too small of a predetermined tree density, or, alternatively, in response to an exceedance of a predetermined tree density, as shown in map (200), identify a plurality of trees as a forest (256). Furthermore, the recording of mountains (255) and of a street, identified by corresponding lane markings (258) that lead into mountains (255) (indicated here by arrows) may also be recorded as a tunnel (251).

Additional options for evaluating the contents of the map provide, for example, that map (200) be locally and/or globally assessed as no longer being current when it is recorded that individual, second driving environment features no longer have a shape that conforms with that of a first driving environment feature stored in the map that is comparable to the second driving environment feature. For example, the shape of lake (253) may change due to construction work and/or the shape of building (252) due to a modification. In such a case, map (200) is, in fact, assessed as valid, but just as no longer current. Conversely, the contents of map (200) may be assessed as valid, as well as current when the number of matches to driving environment features, and, for example, to the shape thereof continue to conform.

FIG. 3 shows an exemplary embodiment of the method according to the present invention in the form of a flow chart.

The method begins in step 300.

In step 301, at least one sensor (101) of at least one vehicle (100) records at least one second driving environment feature.

In step 302, it is ascertained whether this at least one recorded, second driving environment feature may be compared to a first driving environment feature contained in map (200). Step 303 follows if a comparison is possible. Step 300 follows if no comparison is possible.

In step 303, map (200) is evaluated on the basis of the comparison of the first and second driving environment features in step 302.

The method ends in step 304.

Another specific embodiment is based on a two-step process. In a first step, a statistical hypothesis step is implemented for each recorded, second driving environment feature in order to confirm or refute the hypothesis of the existence thereof. To that end, the observed, second driving environment features are initially associated with the first driving environment features in map (200), and the hypothesis test is then performed on the basis of the result of the association.

It holds in this context that, with each recording of a second driving environment feature that confirms a first driving environment feature in map (200), the existence probability thereof rises. If a second driving environment feature (for example, in spite of a clear view) is not able to be recorded, the existence probability thereof drops off. On the other hand, if a second driving environment feature is hidden, the existence probability value is not updated.

In a second step, map (200) is locally evaluated in the recording region of the sensors. To that end, the results of the existence tests of all recorded, second driving environment features of the at least one sensor (101) of vehicle (100) are merged. On the basis of the number of either confirmed, second driving environment features and/or refuted, second driving environment features and/or newly recorded, second driving environment features, thus driving environment features that are not yet contained in the map (200), the contents of map (200) may be locally assessed as valid at this stage, that is to say the local validity thereof may be determined.

Either the at least one vehicle (100) or also at least one further vehicle is then operated accordingly on the basis of the number of either confirmed and/or refuted and/or newly added, second driving environment features. In accordance with the inventive method described here, the contents of a map (200) are evaluated for partially or highly automated vehicles, in particular, since the safety of such a vehicle may be thereby dramatically enhanced.

What is claimed is:

1. A method for evaluating the contents of a map, the map containing at least one first driving environment feature, the method comprising:
   recording at least one second driving environment feature by at least one sensor of at least one vehicle;
   comparing the at least one first driving environment feature contained in the map to at least one second, recorded driving environment feature; and
   evaluating the contents of the map as a function of the comparison;
   wherein the recording of the at least one second driving environment feature by the at least one sensor of the at least one vehicle takes place by at least by indirect detection by the assignment of least one of (a) at least one recorded driving environment property, and (b) at least one recorded driving environment object, each of which indirectly characterizes the at least one second driving environment feature.

2. The method as recited in claim 1, wherein the recording of the at least one second driving environment feature by the at least one sensor of the at least one vehicle also takes place by directly detecting the at least one second driving environment feature.

3. The method as recited in claim 1, further comprising:
   based on the comparison, checking whether the at least one recorded, second driving environment feature is verified by the at least one first driving environment feature in the map.

4. The method as recited in claim 1, wherein the evaluation is performed in accordance with specified evaluation criteria.

5. The method as recited in claim 4, wherein the evaluation criteria are specified in such a way that one of: (i) the contents of the map are assessed as locally valid within the detection range of the at least one sensor of the at least one vehicle in that a predefined first minimum number of first driving environment features, which are contained in the map, is verified by a second predefined minimum number of second driving environment features, which are recorded by the at least one sensor of the at least one vehicle, or (ii) the contents of the map are locally assessed as invalid in that a predefined first minimum number of first driving environment features is not verified by a second predefined minimum number of second driving environment features.

6. The method as recited in claim 1, wherein the contents of the map are evaluated locally within a detection range of the at least one sensor of the at least one vehicle.

7. The method as recited in claim 1, wherein the evaluation criteria are specified in such a way that the contents of the map are evaluated in that a predefined first minimum number of first driving environment features which are contained in the map is compared to and/or verified by a second predefined minimum number of second driving environment features which are recorded by the at least one sensor of the at least one vehicle.

8. The method as recited in claim 1, wherein at least one of: (i) the at least one first driving environment feature, and (ii) the at least one second driving environment feature, is a structure, the structure being at least one of: (a) a tunnel, (b) a bridge, (c) a service area, (d) a building, (e) a toll plaza, and (f) a service station.

9. The method as recited in claim 1, wherein at least one of: (i) the at least one first driving environment feature, and (ii) the at least one second driving environment feature, is a geographical feature, the geographical feature being at least one of: (i) a lake, (ii) a river, (iii) a tree, (iv) a stream, (v) a mountain, and (vi) a forest.

10. The method as recited in claim 1, wherein at least one of: (i) the at least one first driving environment feature, and (ii) the at least one second driving environment feature, is a traffic sign, the traffic sign being at least one of: (a) a street sign, and (b) a traffic light.

11. The method as recited in claim 1, wherein at least one of: (i) the at least one first driving environment feature, and (ii) the at least one second driving environment feature, is a component of the traffic infrastructure, the component being at least one of: (a) a guardrail, (b) a parking space, and (c) a pavement marking.

12. A device for evaluating the contents of a map, the map containing at least one first driving environment feature, comprising:
   a first element for recording at least one second driving environment feature by at least one sensor of at least one vehicle;
   a second element for comparing the at least one first driving environment feature contained in the map to at least one second, recorded driving environment feature; and
   a third element for evaluating the contents of the map as a function of the performed comparison;

wherein the recording of the at least one second driving environment feature by the at least one sensor of the at least one vehicle takes place by at least by indirect detection by the assignment of least one of (a) at least one recorded driving environment property, and (b) at least one recorded driving environment object, each of which indirectly characterizes the at least one second driving environment feature.

13. The device as recited in claim 12, wherein the second element is configured so that, on the basis of the comparison, the second element checks whether the at least one recorded, second driving environment feature is verified by the at least one first driving environment feature in the map.

14. The device as recited in claim 12, wherein the third element is configured so that the contents of the map are evaluated in that a predefined first minimum number of first driving environment features, which are contained in the map, is compared to and/or verified by a second predefined minimum number of second driving environment features which are recorded by the at least one sensor of the at least one vehicle.

15. A method for operating at least one vehicle, the method comprising:
- operating the at least one vehicle as a function of an evaluating of contents of a map which contains at least one first driving environment feature;
- wherein the evaluating includes:
  - recording at least one second driving environment feature by at least one sensor of at least one vehicle;
  - comparing the at least one first driving environment feature contained in the map to at least one second, recorded driving environment feature; and
  - evaluating the contents of the map as a function of the performed comparison;
  - wherein the recording of the at least one second driving environment feature by the at least one sensor of the at least one vehicle takes place by at least by indirect detection by the assignment of least one of (a) at least one recorded driving environment property, and (b) at least one recorded driving environment object, each of which indirectly characterizes the at least one second driving environment feature.

\* \* \* \* \*